United States Patent
Portolani et al.

(10) Patent No.: US 7,610,375 B2
(45) Date of Patent: Oct. 27, 2009

(54) INTRUSION DETECTION IN A DATA CENTER ENVIRONMENT

(75) Inventors: Maurizio Portolani, Milpitas, CA (US); Mauricio Arregoces, Rancho Palos Verdes, CA (US); Timothy W. Stevenson, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 11/090,083

(22) Filed: Mar. 25, 2005

(65) Prior Publication Data

US 2006/0095968 A1 May 4, 2006

Related U.S. Application Data

(60) Provisional application No. 60/623,810, filed on Oct. 28, 2004.

(51) Int. Cl.
*G06F 15/173* (2006.01)
(52) U.S. Cl. .......................................... 709/224; 726/23
(58) Field of Classification Search ................. 709/224
See application file for complete search history.

(56) References Cited

U.S. PATENT DOCUMENTS

| 2001/0055274 | A1* | 12/2001 | Hegge et al. ................. 370/229 |
| 2002/0021791 | A1* | 2/2002 | Heilmann et al. ........... 379/189 |
| 2002/0035639 | A1* | 3/2002 | Xu ............................... 709/238 |
| 2002/0194342 | A1* | 12/2002 | Lu et al. ...................... 709/227 |
| 2003/0009699 | A1 | 1/2003 | Gupta et al. |
| 2003/0172167 | A1* | 9/2003 | Judge et al. ................. 709/229 |
| 2004/0034800 | A1* | 2/2004 | Singhal et al. .............. 713/201 |
| 2004/0205188 | A1 | 10/2004 | Ahlard et al. |
| 2006/0075093 | A1 | 4/2006 | Frattura et al. |

OTHER PUBLICATIONS

Edwards, Simon. "Vulnerabilities of Network Intrusion Detection Systems: Realizing and Overcoming the Risks." May 1, 2002, SecurityTechNet.com: <http://www.securitytechnet.com/resource/security/ids/IDSB_White_Papera.pdf>. pp. 1-18.*
"Catalyst 6500 Series Cisco IOS Software Configuration Guide, 12.2 SX." Cisco Systems. Aug. 10, 2003. pp. 1-21. <http://web.archive.org/web/20030810211146/www.cisco.com/en/US/products/hw/switches/ps708/products_configuration_guide_book09186a00801609ea.html>.*

(Continued)

*Primary Examiner*—Andrew Caldwell
*Assistant Examiner*—Christopher Biagini
(74) *Attorney, Agent, or Firm*—Brian N. Young; Trellis IP Law Group, PC (57) ABSTRACT

An intrusion detection system (IDS) is capable of identifying the source of traffic, filtering the traffic to classify it as either safe or suspect and then applying sophisticated detection techniques such as stateful pattern recognition, protocol parsing, heuristic detection or anomaly detection either singularly or in combination based on the traffic type. In a network environment, each traffic source is provided with at least one IDS sensor that is dedicated to monitoring a specific type of traffic such as RPC, HTTP, SMTP, DNS, or others. Traffic from each traffic source is filtered to remove known safe traffic to improve efficiency and increase accuracy by keeping each IDS sensor focused on a specific traffic type.

22 Claims, 3 Drawing Sheets

OTHER PUBLICATIONS

Guthrie, Jeremy M. "IDS Load Balancing HOWTO." Jul. 27, 2005. pp. 1-14. <http://lwn.net/Articles/145406/>.*

Cisco Systems, Inc., "SAFE: IDS Deployment, Tuning, and Logging in Depth", Copyright © 1992-2004, 58 pages.

Cisco Systems, Inc., "Networking Solutions—Safe Blueprint—Safe: IDS Deployment, Tuning, and Logging in Depth", Copyright © 1992-2005, 45 pages.

Cisco Systems, Inc. "Configuring the Catalyst Switched Port Analyzer (SPAN) Feature—Document ID: 10570", Copyright © 1992-2004, 34 pages.

Cisco Systems, Inc., "Cisco Threat Defense System Guide—How to Provide Effective Worm Mitigation", Apr. 2004, Copyright © 1992-2004, 23 pages.

Cisco Systems, Inc., "Products & Services—Cisco IPS 4200 Series Sensors—Cisco IOS Intrusion Detection System Software App Overview", Copyright © 1991-2005, 5 pages.

Cisco Systems, Inc., "Products & Services—Cisco IPS 4200 Series Sensors—The Science of IDS Attack Identification—White Paper", Copyright © 1992-2005, 5 pages.

Cisco Systems, Inc.; "Products & Services—Cisco IPS 4200 Series Sensors—Mitigating Attacks in VoIP Environments—White Paper", Copyright © 1992-2005, 5 pages.

Cisco Systems, Inc., "Products & Services—Cisco IPS 4200 Series Sensors—Cisco Intrusion Prevention System Solution—Data Sheet", Copyright © 1992-2005, 5 pages.

* cited by examiner

INTRUSION DETECTION IN A DATA CENTER ENVIRONMENT

CROSS-REFERENCES TO RELATED APPLICATIONS

This application claims priority from commonly assigned provisional patent application entitled "Data Center Network Design And Infrastructure Architecture" by Mauricio Arregoces and Maurizio Portolani, application No. 60/623,810, filed Oct. 28, 2004 the entire disclosure of which is herein incorporated by reference.

BACKGROUND AND SUMMARY OF THE INVENTION

A successful Internet presence requires that a company has a web site and the computer resources available to handle a large volume of hits from both customers and employees. E-business is now generally accepted as a valid way to conduct business and is increasingly accounting for a significant portion of commerce worldwide. At the same time, a successful Internet presence means that the company must provide adequate security of customer records, such as credit card numbers, as well as its own proprietary information. However, once the Internet presence is established, the computer resources are exposed to a group, generally referred to as hackers, whose sole intent is to gain unauthorized access to the company's computer resources. Hackers may attempt to obtain information of financial value or they may attempt to infiltrate a company's computer resources for the intellectual or political challenge. Other hackers are simply intent on trouble-making.

Regardless of the hackers' motivation, it is incumbent to identify and prevent unauthorized access to sensitive corporate computer resources. In practice, however, it is not a simple task because it is necessary that the company's employees and customers, not all of whom may be immediately recognized, must be provided access to the very same resources. None the less, the task of identifying an intrusion is a fundamental part of maintaining an on-line presence.

To detect intrusion, businesses with a data centers commonly include an intrusion detection system or IDS. The IDS monitors the data center network by analyzing network packets and looking for signs of other malicious or suspicious anomalies that are indicated by inappropriate, incorrect, or anomalous activity that would indicate that a hacker is attempting to intrude.

The IDS may be a network-based IDS or a host-based intrusion prevention system implementation. A network-based IDS monitors network traffic flowing through a switch or router. A host-based IDS monitors system level events to detect malicious activity on that host. The IDS is the equivalent of a surveillance tool that reports suspicious activity to an IDS management system. To illustrate, one IDS, such as the Cisco IDS-4250 which is commercially marketed by Cisco Systems, utilizes sophisticated detection techniques that include stateful pattern recognition, protocol parsing, heuristic detection, and anomaly detection. These detection techniques provide comprehensive protection from a variety of both known and unknown threats.

In a network environment, IDSs are deployed throughout the network but it is especially important to place IDSs on network segments where attacks are most likely to come through. A network-based IDS protects all devices that are accessible on the segment where they are connected and identifies malicious activities. In a data center environment having multiple subnets, it is desirable that an IDS sensor monitor each subnet. Thus, if a data center has three subnets, traffic on a first subnet should be monitored by a first IDS, traffic on the second subnet should be monitored by a second IDS. Unfortunately, in some networks there is a practical limitation on the number of sessions an IDS sensor can monitor due to the traffic capturing technology. Thus, there is no ability to monitor the third subnet with a third IDS. In such instances, two or more subnets may be lumped together and monitored by a single IDS. In other instances it is desired to selectively monitor traffic on a subnet, such as, for instance, HTTP client-to-server traffic should be monitored by one IDS sensors, SMTP client-to-server traffic should be monitored by another sensor, DNS traffic by yet another sensor while filtering all other traffic originating and terminating on the same subnet.

In accordance with the present invention, a system and method for monitoring multiple subnets and protocols with corresponding multiple IDSs is provided. Advantageously, the present invention reduces false positives of a network attack, eliminates traffic noise within a subnet and provides greater granularity in monitoring network traffic on each subnet by selecting monitoring traffic to optimize performance.

The foregoing and additional features and advantages of this invention will become apparent from the detailed description and review of the associated drawing figures that follow.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, parts, and/or the like. In other instances, well-known structures, materials, or operations are not specifically shown or described in detail to avoid obscuring aspects of embodiments of the present invention.

Figure 1:
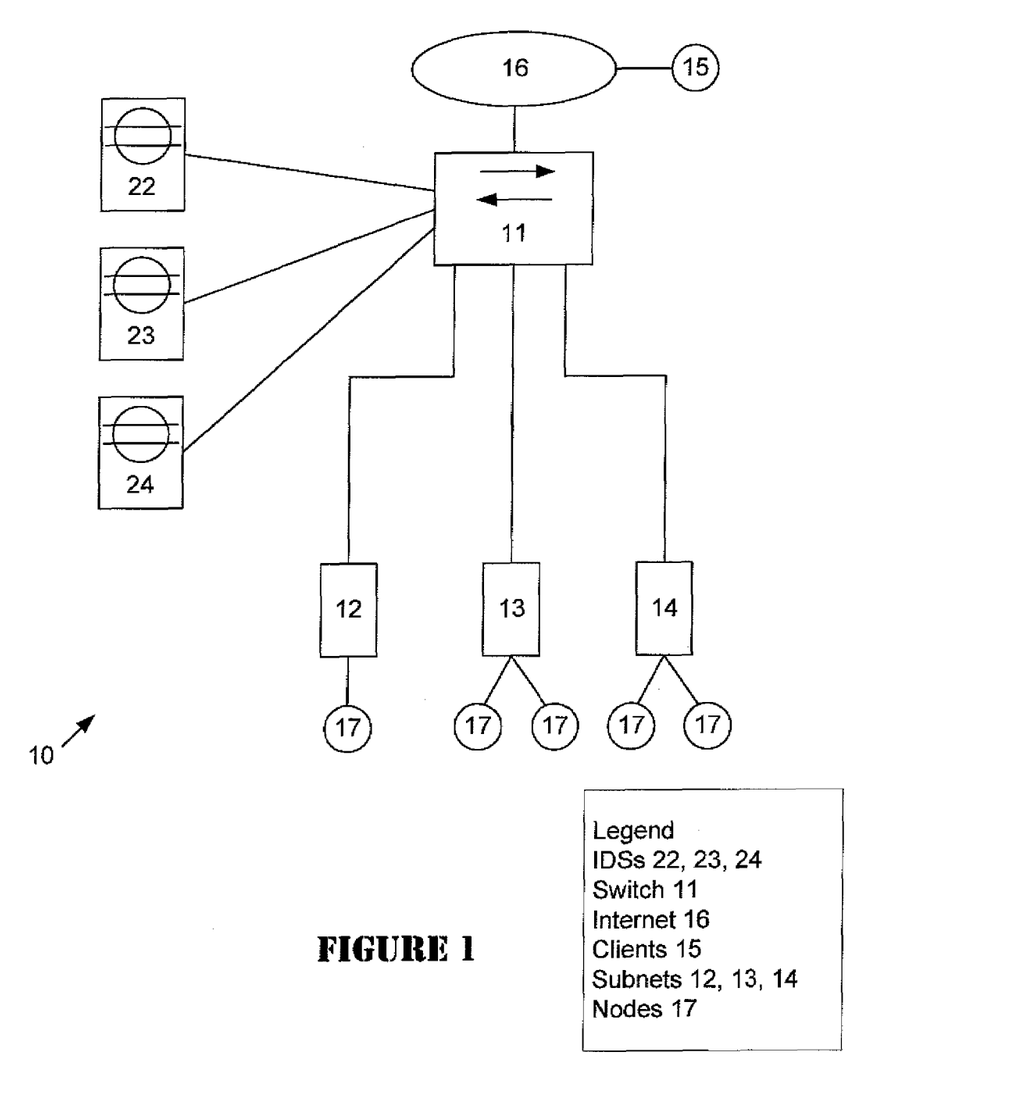
FIG. 1 is a simplified block diagram illustrating a network segment having intrusion detection systems associated with each traffic source in accordance with one embodiment of the present invention.

Referring now to the drawings more particularly by reference numbers, a network segment 10 of a network environment is illustrated in FIG. 1. Network segment 10 is illustrative of a portion of a network environment that is typically used for a data center or a large corporate or enterprise network. Network environment 10 includes a router or switch 11 and subnets 12, 13 and 14 which partition the network environment into logical segments. Although only three subnets are illustrated in FIG. 1, it is to be appreciated that any number of such subnets may exist in a network segment. Further, the IDSs are arbitrarily described herein as discrete systems, but it will be appreciated that IDSs may be implemented in software and executed by a processor associated with switch 11. Alternatively, the IDS may be a blade that may share a common chassis with one or more other network devices such as a switch, router, firewall, bridge, concentrator, scanners, load balancer or content engine.

In the network environment, switch 11 functions as the gateway to each of the subnets. Each subnet 12-14 includes a node 17 that defines a plurality of servers, such as web server, or other protected network accessible resources. Network segment 10 is accessible to clients 15 over a core network such as the Internet 16. It should be appreciated that clients may connect to the network segment from a variety of different networks and that the Internet is shown merely to illustrate an external core network. In this embodiment, each subnet is monitored by an intrusion detection system or IDS. Specifically, IDSs 22-24 monitors traffic on the subnets.

Network-based sensors are systems that connect to network segments and inspect traffic to detect intrusions and suspicious activities. These sensors may be implemented in software on routers and firewalls, as standalone appliances, or as hardware modules. Network-based sensors usually use two network interfaces, one that connects to the network being monitored and another one to a secure segment that provides access to a management system. The monitoring interface does not have a MAC address, so it is unable to send traffic. The switch port where the IDS is connected sees all the traffic mirrored by the switch. The management interface preferably has a MAC address and an IP address to communicate with the monitored network devices. Network-based sensors should be deployed on network segments where attacks are more likely to come through (that is, at the Internet Edge) and on the segments housing mission-critical servers.

Figure 2:
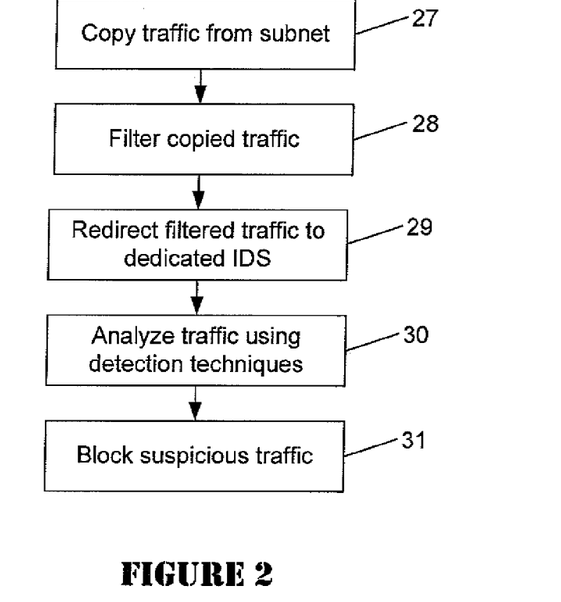
FIG. 2 is block diagram illustrating a method for operating the intrusion detection system on a network segment in accordance with the embodiment shown in FIG. 1.

The monitoring process is illustrated in FIG. 2. The monitoring of each subnet begins upon receipt of traffic at switch 11 with a destination at one of the nodes 17. A copy of the traffic is made as indicated at step 27. The copied traffic is then filtered to remove uninteresting traffic, as indicated at step 28. The copied and filtered traffic is redirected to the dedicated IDS as indicated at step 29. The remaining traffic is analyzed by the IDS by applying various detection techniques to protect the devices connected to node 17 from perceived threats as indicated at step 30.

The detection techniques may include stateful pattern recognition, protocol parsing, heuristic detection, anomaly detection or other techniques. To perform more specific monitoring on the subnets or on the protocols, it is preferred that a specific set of signatures be selected that closely match the intent of the traffic monitoring for each subnet although anomaly-based systems are contemplated. Anomaly-based systems define normal activities in terms of network traffic and system resource usage so that any deviation from a defined baseline is considered an attack after alarms are generated any time there is a significant deviation from the statistical values.

Signature-based systems explicitly define which activity is considered malicious. A particular signature identifies this malicious activity and the IDS compares the traffic and resource utilization with the signature. A match in the comparison would indicate the presence of a malicious event. In the comparison process, each and every packet is compared against the signature. It is important to note that signature patterns can be dispersed in multiple packets, so the network-based system must reassemble the session and eventually perform the protocol analysis.

Signatures are grouped according to the types of attacks they attempt to match. For example, an IDS may include embedded signatures, which are specific, known attack signatures that come with the IDS or connection signatures, which are protocol-specific signatures. By way of example, the protocol definition (TCP/UDP) could include the port number. The IDS may also include string-matching signatures, which is an attack signature based on portions of the payload in packets, or ACL signatures, which are policy-violation signatures logged by network devices.

Examples of signatures used in the detection of attacks destined to various server types in each subnet include HTTP signatures: 3455—Java Web Server Cmd Exec; 5087—WWW Sun Java Server Access; 5312—*.jsp/*.jhtml Java Execution; 5375—Apache mod_dav Over.ow; 5103—WWW SuSE Apache CGI Source Access; and 5160—Apache ? indexing .le disclosure bug. RPC-based application signatures include: 6101—RPC Port Unregistration; 6102—RPC Dump; 6103—Proxied RPC Request; 6104—RPC Set Spoof; 6105—RPC Unset Spoof; 6110—RPC RSTATD Sweep; 6111—RPC RUSERSD Sweep; 6112—RPC NFS Sweep; 6113—RPC MOUNTD Sweep; and 6114 RPC YPPASSWDD Sweep. Windows/NetBIOS signatures include: 3300—NetBIOS OOB Data; 3301—NETBIOS Stat; 3302—NETBIOS Session Setup Failure; 3303—Windows Guest Login; 3304—Windows Null Account Name; 3305—Windows Password File Access; 3306—Windows Registry Access; and 3327—Windows RPC DCOM Over.ow.

The signatures used in network environment belong to signature groups such as a HTTP group, because hackers use HTTP to gain access to most applications. Other signature groups include a RPC group, which is widely used for server-to-server communications, and groups specific to certain operating systems such as Windows/NetBIOS.

If the IDS is deployed at the Internet edge, common signatures for protecting servers and applications include the following: DNS signatures examples include: 6050—DNS HINFO Request; 6051—DNS Zone Transfer; 6052—DNS Zone Transfer from High Port; 6053—DNS Request for All Records; 6054—DNS Version Request; 6055—DNS Inverse Query Buffer Overflow and 6056—DNS NXT Buffer Overflow. HTTP signatures examples include: 5188—HTTP Tunneling; 5055—HTTP Basic Authentication Overflow; 3200—WWW Phf Attack; 3202—WWW .url File Requested; 3203—WWW .lnk File Requested; 3204—WWW .bat File Requested; 3212—WWW NPH-TEST-CGI Attack; and 3213—WWW TEST-CGI Attack. FTP signatures examples include: 3150—FTP Remote Command Execution; 3151—FTP SYST Command Attempt; 3152—FTP CWD~root; 3153—FTP Improper Address Specified; 3154—FTP Improper Port Specified; 3155—FTP RETR Pipe Filename Command Execution; 3156—FTP STOR Pipe Filename Command Execution; 3157—FTP PASV Port Spoof; 3158—FTP SITE EXEC Format String; 3159—FTP PASS Suspicious Length; and 3160—Cesar FTP Buffer Overflow. E-mail signatures examples include: 3100—Smail Attack; 3101—Sendmail Invalid Recipient; 3102—Sendmail Invalid Sender; 3103—Sendmail Reconnaissance; 3104—Archaic Sendmail Attacks; 3105—Sendmail Decode Alias; 3106—Mail Spam; and 3107—Majordomo Execute Attack.

The identification process may require tuning the signatures by monitoring the alarms and determining what is normal and abnormal when threats are detected but it is preferred that the IDS be configured to specifically alert on protocols allowed by any firewalls protecting the subnet. When a threat is detected, suspicious traffic alarms are generated and the threat is preferably blocked by the IDS as indicated at step 31.

The IDS is capable of responding to identified security incidents using specific mechanisms. For example, the entire IP session that corresponds to a detected intrusion could be logged. The logs are commonly used for forensic analysis to determine the details of the event and identify where the security gap was and how to correct it. This information can also be use as evidence if law enforcement is required. Alternatively, the IDS could be configured for TCP resets on behalf of a victim system. In this configuration, the IDS sends a TCP reset generated using the source IP address of the victim and a random MAC address to avoid conflicts with Layer 2 switches and the MAC address of the victim. The IDS could also instruct a network device such as a router, switch, or firewall to dynamically apply an ACL to block the traffic coming from an attacker. This response is the most aggressive response and can result in a self-induced DoS problem when it accidentally blocks valid traffic. In this scenario, the IDS can communicate with the shunning devices using various protocols such as Telnet and Secure Shell (SSH).

Figure 3:
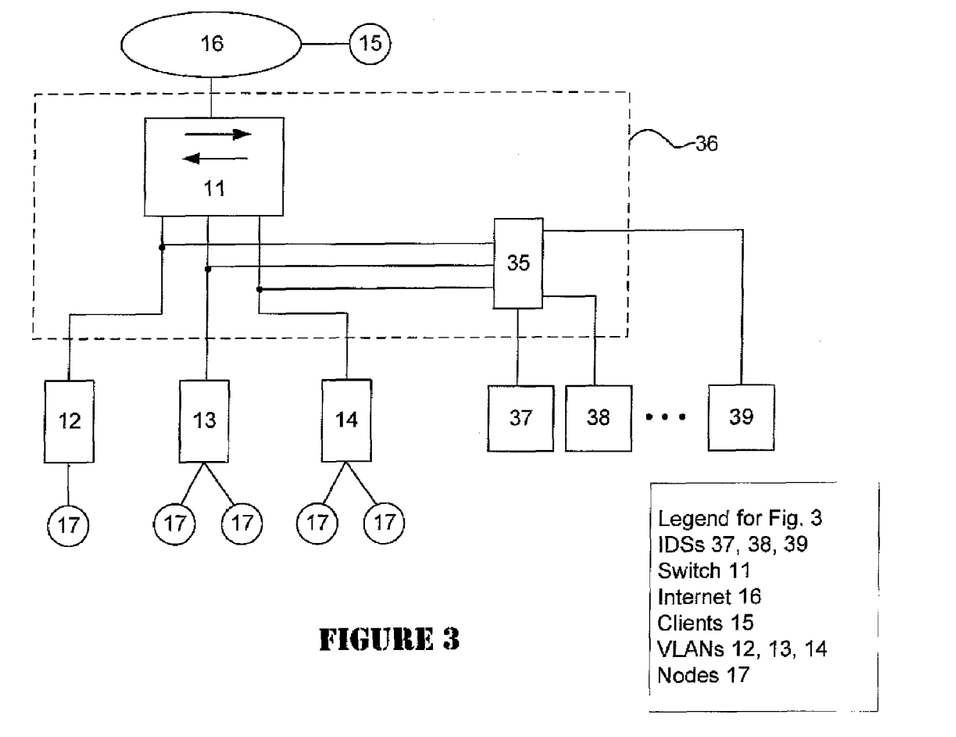
FIG. 3 is another simplified block diagram illustrating a network segment having intrusion detection systems associated with each traffic source in accordance with another embodiment of the present invention.

In operation, switch 11 builds a Layer 2 forwarding table based on the source MAC address of the different received packets. The forwarding table, or access control list, is used by switch 11 to forward packets destined for a MAC address directly to a corresponding VLAN. This feature is often referred to as unicast forwarding because the packet is sent from the source only to the destination. In switches that support unicast forwarding, traffic designated for a monitored VLAN is copied by switch 11 and sent it to a VLAN by configuring a VACL feature, the remote or RSPAN VLAN. The VACL configuration defines the traffic type to be monitored. Specifically, as illustrated in FIG. 3, traffic designated for VLAN 12 is copied by switch 11 and the copy is sent it to a VLAN 35. The use of RSPAN feature differently from what it's intended use but provides the ability to redirect traffic based on selected parameters. VLAN 35 is preferably a local VLAN and may even be part of switch 11, as indicated by dashed line 39. If VLANs 12-14 are configured for capturing, the designated traffic from each such VLAN is copied to VLAN 35. To keep each of the dedicated IDSs from seeing all the traffic, operating software or hardware redirects traffic from VLAN 35 to the appropriate dedicated IDS. Thus, traffic on VLAN 12 is copied by switch 11 and sent to VLAN 35 where it can be redirected to IDS 37. Similarly, traffic on VLANs 13 and 14 are copied to VLAN 35 and then can be redirected to IDSs 38 and 39, respectively. In an alternative embodiment, traffic can be redirected based on the protocol. In yet another embodiment, traffic is redirected based on source and protocol. In general, the redirection may be as granular as desired for a particular application.

Figure 4:
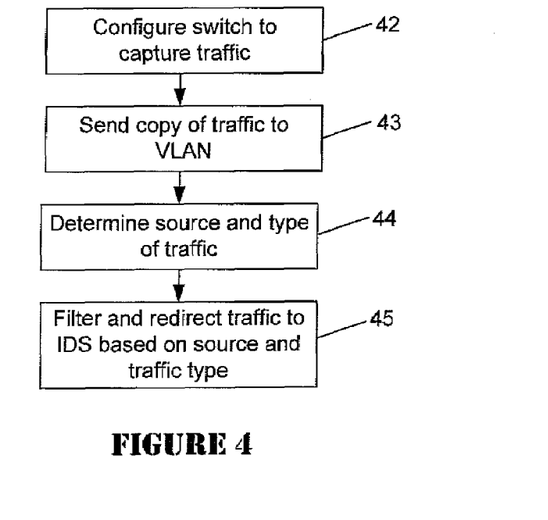
FIG. 4 is a block diagram illustrating the operation of the embodiment of the present invention shown in FIG. 3.

The monitoring process for the embodiment of FIG. 3 is illustrated in FIG. 4. Redirection of traffic occurs with switch 11, which is configured to designate which VLAN traffic to copy as indicated at step 42. If switch 11 is a Cisco switch, redirection is accomplished by configuring the switch to SPAN each VLAN or link to another VLAN where traffic is to be copied. SPAN copies traffic to a VLAN, which can also be carried to a switch different from switch 11.

The copied traffic is then sent to VLAN 35 as indicated at step 43. Once the copied traffic is received at VLAN 35, the traffic type and source VLAN is determined as indicated at step 44. Traffic type may be determined by examining the packet header. Based on the traffic type and the source, VLAN 35 filters and redirects traffic to a specific IDS as indicated at step 45. This operation is preferably performed by applying a VACL REDIRECT decision on VLAN 35. VACL REDIRECT is executed by the operating system and applies to all packets that are routed into or out of VLAN 35. The VACL REDIRECT is strictly for packet filtering and redirecting traffic to specific physical switch ports based on the configuration.

More specifically, VACL REDIRECT is used to decide which port traffic is to go out on based on information such as the subnet, the protocol and the layer 4 port. Thus, if a certain traffic pattern is received, VLAN 35 recognizes the source, the destination, the protocol and the layer 4 port of the traffic and redirects the traffic to one of several designated IDSs.

The IDS uses signatures or templates to detect unusual behaviors on the network that are considered security violations by comparing the templates against traffic patterns or specific traffic conversations, looking for a match. A match implies that an anomaly has been detected and an action is required. The action could be just sending an alarm or sending an alarm and applying a measure designed to stop the anomaly.

Figure 5:
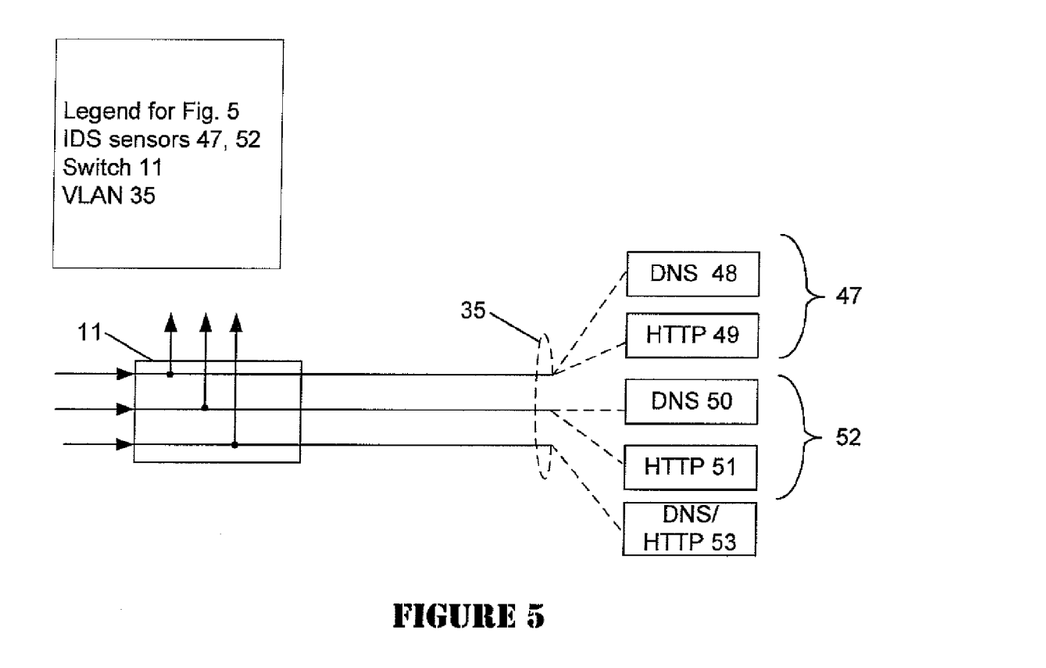
FIG. 5 is block diagram illustrating a method for operating the intrusion detection system on a network segment in accordance with the embodiment shown in FIGS. 3 and 4.

FIG. 5 illustrates the method for copying and then redirecting traffic to a designated IDS. Specifically, ingress traffic at switch 11 is selectively copied by means of the SPAN command that is executed by the operating system active on switch 11. Thus, one or more of a plurality of ingress streams are copied to VLAN 35 before egress from switch 11. VLAN 35 monitors ingress streams by means of a VACL REDIRECT command that is executed by the operating system active. The VACL REDIRECT functions to determine traffic type, such as MAC, RPC or HTTP, and then routes it to a specific IDS. For example, with respect to traffic copied from VLAN 12, the VACL REDIRECT command recognizes the source as VLAN 12, which selects a first group of IDS sensors 47. Then based on the type of traffic, the VACL REDIRECT redirects traffic of a specific type to a corresponding IDS. To illustrate, if traffic on VLAN 12 includes RPC and HTTP traffic, the RPC traffic is sent to IDS sensor 48 and HTTP traffic is sent to IDS sensor 49. Similar two level hierarchal decisions are made to route traffic to the designated IDS. Traffic on VLAN 13 is routed to IDS sensor 50 if it is RPC traffic or to IDS sensor 51 if it is HTTP traffic. IDS sensors 50 and 51 are in a second group of IDSs 52. Similarly, traffic on VLAN 14 is routed to and IDS group 53 if either RPC or HTTP traffic. The intrusion detection sensors associated with each of said plurality of traffic sources may comprise a single virtualized IDS sensor.

In general, if a different traffic protocol, pattern or source is recognized, it is directed to a different, dedicated IDS. With this configuration, many different IDS sensors can be defined each of which monitors a different traffic protocol or pattern. The sensors can be as granular as the protocol number allows. The VACL does all the analysis as to whether traffic is to be copied or redirected. The access control list is configured to define the subnet to use for a particular traffic source. Indeed, with Layer 4 protocol and layer 4 ports in switch 11, it is possible to be very specific as to what type of traffic each IDS will receive. Further, it is possible to filter extraneous alarms by eliminating uninteresting traffic from within a subnet from being seen by an IDS. This filtering functions means that known safe traffic is not passed through the IDS and only suspected or high risk traffic need be reviewed by the IDS.

The present invention achieves important milestones by making it possible to provide more than one or two IDSs to monitor traffic from a plurality of subnets. Further, the present invention makes it possible for IDSs to operate more efficiently by limiting the type of traffic that is provided to each IDS reduces the number of false positives that will be reported. Further efficiency improvement results by identifying and filtering safe traffic. This filtering step improves latency and reduces the occurrence of false alarms. Thus, with the present invention, only a subset of traffic is monitored by each IDS while safe traffic within a common subnet is not necessarily monitored. It is herein disclosed that while mechanisms familiar to the IP industry could be used in the embodiments described herein, it is to be understood that any device capable of doing access control list functions together with a redirect function may also be useable for the implementation of the present invention. With the present invention, the cost reduction due to preventing network problems caused by malicious hackers is substantial and immediate.

Accordingly, the present invention provides a new intrusion detection system capable of identifying the source of traffic, filtering the traffic to classify it as either safe or suspect and then applying sophisticated detection techniques such as stateful pattern recognition, protocol parsing, heuristic detection or anomaly detection. The techniques may be applied either singularly or in combination with IDS sensors that are dedicated to monitoring a specific type of traffic from a specific traffic source. Since traffic is filtered to remove uninteresting traffic and different sensors monitor a different portion of the traffic, efficiency is vastly improved because less traffic is routed to the IDS for monitoring. Thus, the detection techniques employed by each IDS sensor can be specifically targeted and refined to ensure comprehensive protection from a variety of both known and unknown threats while at the same time reducing latency.

Although the invention has been described with respect to specific embodiments thereof, these embodiments are merely illustrative, and not restrictive of the invention. For example, the network may include different routers, switches, servers and other components or devices that are common in such networks. Further, these components may comprise software algorithms that implement connectivity functions between the network device and other devices in a manner different from that described herein.

The executable code described herein may be implemented in any suitable programming language to implement the routines of the present invention including C, C++, Java, assembly language, etc. Different programming techniques can be employed such as procedural or object oriented. The routines can operate in an operating system environment or as standalone routines occupying all, or a substantial part, of the system processing.

In the description herein, specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. In a network environment having a plurality of traffic sources, a system for monitoring traffic on at least a portion of said plurality of traffic sources comprising:
    a plurality of intrusion detection systems; and
    a switch comprising logic that when executed is operable to:
    copy traffic from each of said plurality of traffic sources; and
    redirect the copied traffic to a virtual local area network (VLAN) for intrusion detection monitoring purposes;
    the VLAN comprising the switch or a second switch, either of which comprising logic that when executed is operable to:
    determine a plurality of traffic types associated with the traffic, the plurality of traffic types associated with a plurality of protocol types;
    filter and redirect the traffic using a redirect decision, wherein the logic operable to filter removes a first portion of the traffic from being sent to an intrusion detection system, wherein the logic to redirect is operable to:
    determine a first traffic source for a second portion of traffic associated with a first set of two or more intrusion detection systems configured to monitor traffic for the first traffic source and a second traffic source for a third portion of traffic associated with a second set of one or more intrusion detection systems configured to monitor traffic for the second traffic source;
    for the first traffic source, determine a first intrusion detection system (IDS) in the first set of two or more intrusion detection systems based on the determined traffic type of the second portion of traffic being sent, wherein the two or more intrusion detection systems are associated with processing different traffic types;
    for the second traffic source, determine a second intrusion detection system (IDS) in the second set of one or more intrusion detection systems based on the determined traffic type of the third portion of traffic being sent; and
    redirect the second portion of traffic to the determined first intrusion detection system and the third portion of traffic to the second intrusion detection system.

2. The system of claim 1 wherein the logic operable to filter and redirect comprises logic operable to use a VACL REDIRECT to determine the filtering and redirection.

3. The system of claim 2 wherein the logic operable to filter comprises logic operable to remove the first portion of traffic based on an access control list.

4. The system of claim 3 wherein the logic operable to filter comprises an access control list that distinguishes traffic type.

5. The system of claim 4 wherein the logic operable to redirect comprises logic operable to send traffic to the intrusion detection system based on traffic type.

6. The system of claim 1 wherein said sources of traffic comprise a plurality of VLANs and protocols greater than two and said plurality of intrusion detection systems comprise at least one intrusion detection system for each of said plurality of VLANs and protocols.

7. The system of claim 1 wherein the switch or second switch of the VLAN comprises logic operable to associate at least one intrusion detection system with each traffic source and logic operable to redirect the copied traffic to one of said intrusion detection systems based on traffic type.

8. The system of claim 7 wherein the switch or second switch of the VLAN comprises logic operable to apply various detection techniques to a selected type of traffic.

9. The system of claim 8 wherein said plurality of intrusion detection systems associated with a traffic source include a plurality of intrusion detection sensors for monitoring at least two types of traffic.

10. The system of claim 9 wherein each of said plurality of intrusion detection sensors are adapted to monitor traffic of one of the following types of traffic: RPC, HTTP, DNS, MAC or SMTP.

11. The system of claim 10 wherein said intrusion detection sensors associated with each of said plurality of traffic sources comprises a single virtualized IDS sensor.

12. The system of claim 1, wherein second portion of traffic and the third portion of traffic includes traffic of a same traffic type, wherein the second portion of traffic of the same traffic type is sent to a different IDS from the third portion of traffic of the same traffic type.

13. A method comprising:
    receiving, at a switch of a VLAN, copied traffic received from a plurality of traffic sources for a plurality of subnets, the copied traffic redirected to the VLAN for intrusion detection monitoring purposes;
    determining a plurality of traffic types associated with the traffic, the plurality of traffic types associated with a plurality of protocol types;
    determining a redirect decision to filter and redirect the traffic, wherein filtering removes a first portion of the traffic from being sent to an intrusion detection system, wherein redirecting comprises:
    determining a first traffic source for a second portion of traffic associated with a first set of two or more intrusion detection systems configured to monitor traffic for the first traffic source and a second traffic source for a third portion of traffic associated with a second set of one or more intrusion detection systems configured to monitor traffic for the second traffic source;
    for the first traffic source, determining a first intrusion detection system (IDS) in the first set of two or more intrusion detection systems based on the determined traffic type of the second portion of traffic being sent, wherein the two or more intrusion detection systems are associated with processing different traffic types;
    for the second traffic source, determining a second intrusion detection system (IDS) in the second set of one or more intrusion detection systems based on the determined traffic type of the third portion of traffic being sent; and
    redirecting the second portion of traffic to the determined first intrusion detection system and the third portion of traffic to the second intrusion detection system.

14. The method of claim 13, wherein the plurality of traffic types comprises a port in which the second portion of the traffic is sent, the method further comprising:
  determining the first IDS in the first set of two of more IDSs based on the port, wherein different IDSs in the first set of two or more IDSs are associated with processing different ports.

15. The method of claim 13, wherein the plurality of traffic types comprises a traffic pattern, the method further comprising:
  determining the first IDS in the first set of two or more IDSs based on the traffic pattern, wherein different IDSs in the first set of two or more IDSs are associated with processing different traffic patterns.

16. The method of claim 15, wherein the traffic pattern comprises a traffic source, protocol type, and port.

17. An apparatus comprising:
  one or more processors; and
  logic encoded in one or more tangible media for execution by the one or more processors and when executed operable to:
  receive, at a switch of a VLAN, traffic received from a plurality of traffic sources for a plurality of subnets, the copied traffic redirected to the VLAN for intrusion detection monitoring purposes;
  determine a plurality of traffic types associated with the traffic, the plurality of traffic types associated with a plurality of protocol types;
  determine a redirect decision to filter and redirect the traffic, wherein filtering removes a first portion of the traffic from being sent to an intrusion detection system, wherein redirecting comprises:
  determine a first traffic source for a second portion of traffic associated with a first set of two or more intrusion detection systems configured to monitor traffic for the first traffic source and a second traffic source for a third portion of traffic associated with a second set of one or more intrusion detection systems configured to monitor traffic for the second traffic source;
  for the first traffic source, determine a first intrusion detection system (IDS) in the first set of two or more intrusion detection systems based on the determined traffic type of the second portion of traffic being sent, wherein the two or more intrusion detection systems are associated with processing different traffic types;
  for the second traffic source, determine a second intrusion detection system (IDS) in the second set of one or more intrusion detection systems based on the determined traffic type of the third portion of traffic being sent; and
  redirect the second portion of traffic to the determined first intrusion detection system and the third portion of traffic to the second intrusion detection system.

18. The apparatus of claim 17, wherein the plurality of traffic types comprises a port in which the second portion of the traffic is sent, wherein the logic when executed is further operable to determine the first IDS in the first set of two of more IDSs based on the port, wherein different IDSs in the first set of two or more IDSs are associated with processing different ports.

19. The apparatus of claim 17, wherein the plurality of traffic types comprises a traffic pattern, wherein the logic when executed is further operable to determine the first IDS in the first set of two or more IDSs based on the traffic pattern, wherein different IDSs in the first set of two or more IDSs are associated with processing different traffic patterns.

20. The apparatus of claim 19, wherein the traffic pattern comprises a traffic source, protocol type, and port.

21. The apparatus of claim 17, wherein the plurality of traffic types comprises a traffic source, wherein the logic when executed is further operable to determine the IDS in the plurality of IDSs based on the traffic source, wherein different IDSs are associated with processing different traffic sources.

22. The apparatus of claim 17, wherein the logic when executed is further operable to:
  receive original traffic from the plurality of sources; and
  filter the original traffic such that a portion of the original traffic is copied and redirected to the plurality of IDSs.

* * * * *

UNITED STATES PATENT AND TRADEMARK OFFICE
CERTIFICATE OF CORRECTION

PATENT NO. : 7,610,375 B2 Page 1 of 1
APPLICATION NO. : 11/090083
DATED : October 27, 2009
INVENTOR(S) : Portolani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 384 days.

Signed and Sealed this

Twelfth Day of October, 2010

David J. Kappos
*Director of the United States Patent and Trademark Office*